United States Patent [19]

Kwan

[11] Patent Number: 5,603,098
[45] Date of Patent: Feb. 11, 1997

[54] INTEGRATED RADIATING AND COUPLING DEVICE FOR DUPLEX COMMUNICATIONS

[75] Inventor: Philip P.-L. Kwan, Tempe, Ariz.

[73] Assignee: Motorola, Inc., Schaumburg, Ill.

[21] Appl. No.: 426,379

[22] Filed: Apr. 21, 1995

[51] Int. Cl.⁶ .................. H04B 1/56; H01Q 1/00
[52] U.S. Cl. ............. 455/83; 333/1.1; 343/700 MS; 343/787
[58] Field of Search .............. 333/1.1; 343/700 MS, 343/787; 455/80, 82, 83

[56] References Cited

U.S. PATENT DOCUMENTS

| | | | |
|---|---|---|---|
| 3,611,196 | 10/1971 | Tolksdorf et al. | 333/1.1 |
| 4,222,015 | 9/1980 | Hauth et al. | 333/1.1 |
| 5,264,860 | 11/1993 | Quan | 343/767 |
| 5,502,451 | 3/1996 | Rainville et al. | 343/787 X |

OTHER PUBLICATIONS

An article entitled "Novel Filter Design Incorporating Asymmetrical Stripline Y–Junction Circulators" by H. How et al., *IEEE Transactions on Microwave Theory and Techniques*, vol. 39, No. 1, Jan. 1991, pp. 40–46.

An article entitled "On Stripline Y–Circulation at UHF" by H. Bosma, *IEEE Transactions on Microwave Theory and Techniques*,, Jan. 1964, pp. 61–72.

An article entitled "Operation of the Ferrite Junction Circulator" by C. E. Fay et al., *IEEE Transactions on Microwave Theory and Techniques*,, Jan. 1965, pp. 15–27.

An article entitled "Radiation Frequencies of Ferrite Patch Antennas" by H. How et al., *Electronics Letters*,, vol. 28, No. 15, 16th Jul. 1992, pp. 1405–1406.

An article entitled "Wide–Band Operation of Microstrip Circulators" by Y. S. Wu et al., *IEEE Transactions on Microwave Theory and Techniques*, vol. MTT–22, No. 10, Oct. 1974, pp. 849–856.

*Primary Examiner*—Paul Gensler
*Attorney, Agent, or Firm*—Bradley J. Botsch, Sr.; Frank J. Bogacz

[57] ABSTRACT

An integrated radiating and coupling device (30) for a duplex communication radio (26) is formed using a ferrite body (36) having first and second surfaces. A multi-port circulator (40) is mounted on the first surface. The circulator (40) has at least three ports; a transmitter port (42), a receiver port (44), and an antenna port (38). A patch antenna (32) is mounted on the second surface and connected to the antenna port (38) by, for example, a wire passing through a via hole in the ferrite body (36). The device (30) provides transmitter and receiver isolation, antenna coupling, and filtering in a single integrated structure.

24 Claims, 3 Drawing Sheets

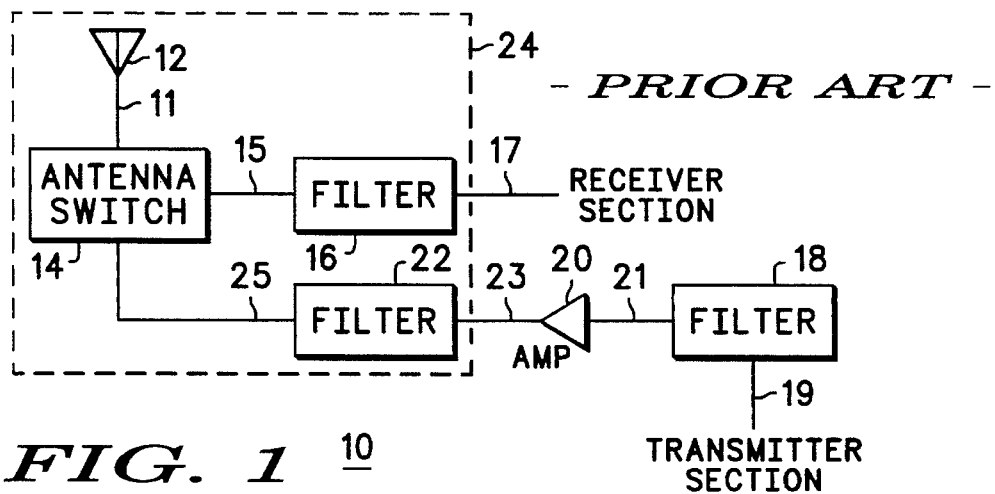
FIG. 1 — PRIOR ART
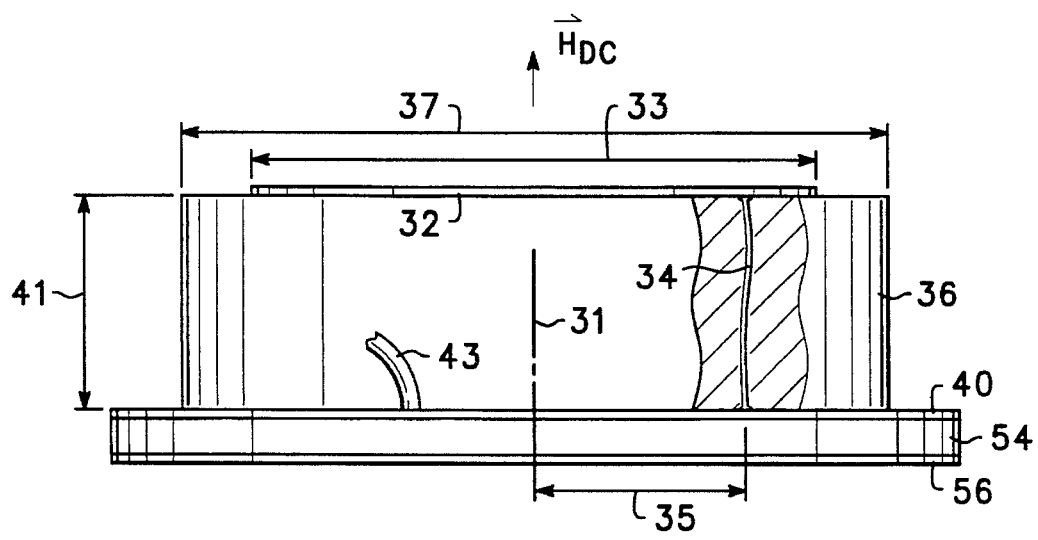
FIG. 2
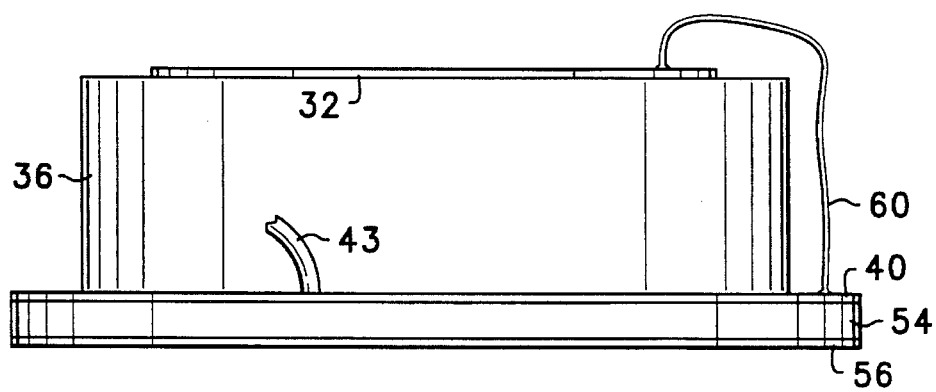
FIG. 5

INTEGRATED RADIATING AND COUPLING DEVICE FOR DUPLEX COMMUNICATIONS

FIELD OF THE INVENTION

This present invention concerns an improved means and method for coupling an antenna to a receiver and transmitter to permit duplex communication.

BACKGROUND OF THE INVENTION

The demand for wireless communications is growing at a rapid pace, in particular, cellular phones, cordless phones, and wireless local area networks (LAN's). In general, all of the components within a hand held communication device should be of light weight, compact, low cost, efficient, and require a minimum amount of power consumption. A further trend is increasing frequency of operation, as for example, from 800 MHz to 2–10 GHz.

FIG. 1 Shows a simplified schematic diagram of typical prior art RF front end unit 10 of a typical duplex communication transceiver. RF front end unit 10 comprises antenna 12 coupled by lead 11 to antenna switch 14. Antenna switch 14 has a receiver path coupled by lead 15 through filter 16 and lead 17 to the receiver circuits of the transceiver. Another path couples the transmitter circuits of the transceiver via line 19 through filter 18, via line 21 through amplifier 20, via line 23 through filter 22 and via line 25 to antenna switch 14. Antenna switch 14 provides duplex communication by switching on demand between receiver chain 15–17 and transmitter chain 19–25. In modern communication systems, antenna switch 14 is, generally, an active device, typically a semiconductor device. As a consequence, it consumes power when it is in operation. Filters 16, 18 are typically SAW filters and filter 22 is typically a ceramic filter. Antenna 12 is typically a small whip or blade antenna.

A limitation of the prior art is that antenna 12, antenna switch 14, filter 16 and filter 22 employ different technologies in the form of separate components which must be interconnected using, for example, a circuit board and external wiring. Each of components 12, 14, 16, 22 is typically individually packaged. Thus, RF front end elements 24 consume more power and occupy more space than is desired for advanced duplex communication systems.

Accordingly, there is an ongoing need to reduce the size and power consumption, and simplify the construction of the RF front end elements needed to provide duplex communication and antenna functions within modern telecommunication transceivers and thereby obtain an improved radio. It is an advantage of the present invention, that the antenna switch of the radio is eliminated and the antenna and signal separator are combined in a single integrated element of comparatively small size.

BRIEF DESCRIPTION OF THE DRAWINGS

FIG. 1 is a simplified electrical block diagram showing a typical prior art RF front end unit of a telecommunications transceiver;

FIG. 2 is a side and partial cutaway cross-sectional view of an integrated radiating and coupling device for duplex communications, according to the present invention;

FIG. 5 is a view analogous to FIG. 2 but according to a further embodiment of the present invention;

DETAILED DESCRIPTION OF THE DRAWINGS

Figure 3:
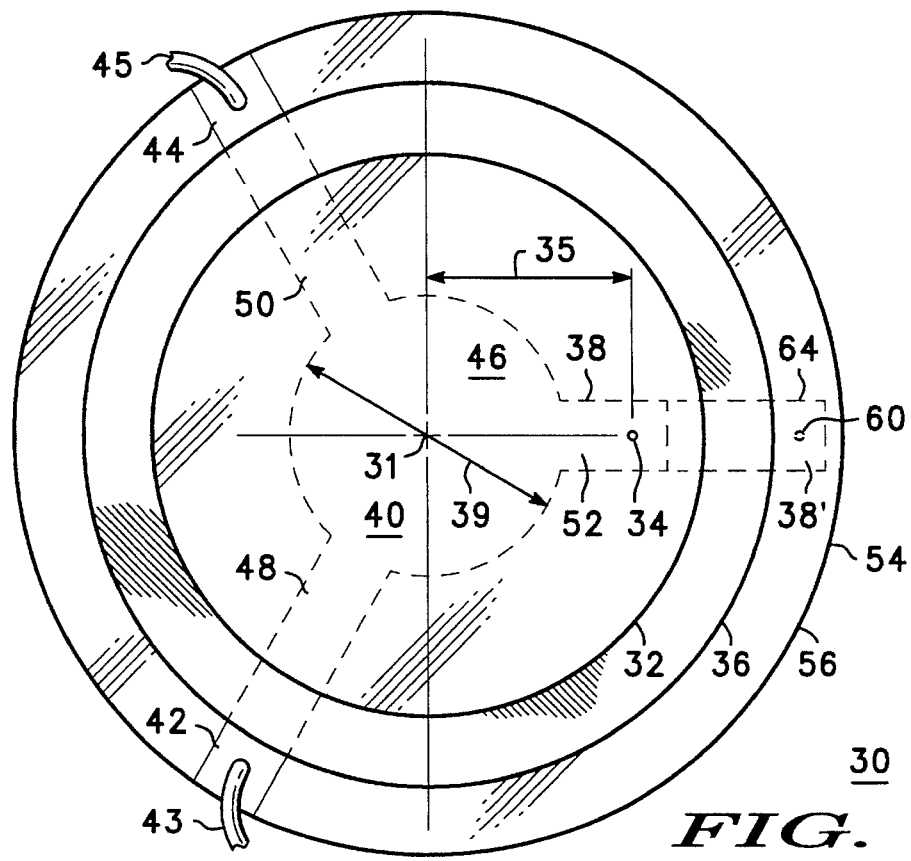
FIG. 3 is a plan view of the device shown in FIG. 2 with the various layers made transparent.
Figure 4:
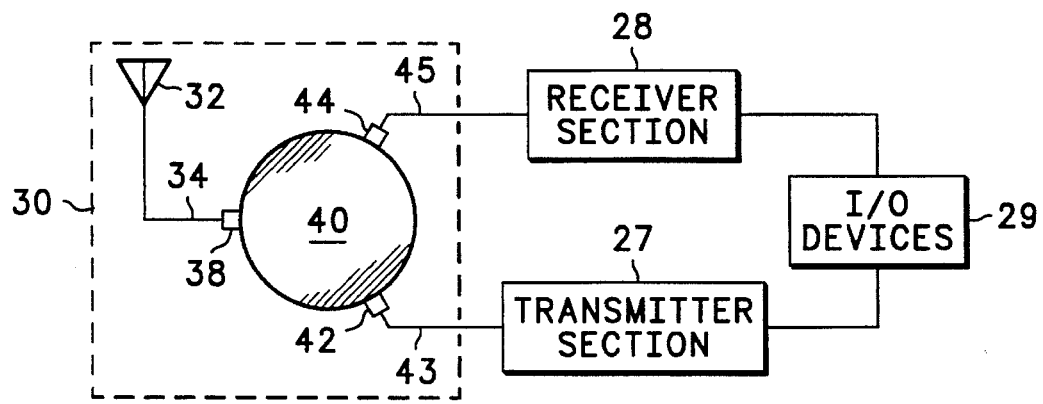
FIG. 4 is a simplified block diagram of a telecommunications transceiver, according to the present invention, employing the device of FIGS. 2–3.

FIG. 2 is a simplified side and partial cutaway cross-sectional view of integrated radiating and coupling device 30 according to the present invention. FIG. 3 is a plan view of the device of FIG. 2 with the various layers and regions of the device of FIG. 2 made transparent so that their spatial relationship can be better understood. FIG. 4 is a simplified block diagram of telecommunication transceiver 26 utilizing the device of FIGS. 2–3.

Referring now to FIGS. 2–4, device 30 comprises radiator 32 which provides the function of antenna 12, coupling line 34 (which provides the function of line 11) passing through ferrite disk 36 to port 38 of branched central conduction 40. Conductor 40 has three ports; first port 42 which is coupled to transmitter section 27 of transceiver 26 via, for example, coaxial cable or stripline 43, second port 44 which is coupled to receiver section 28 of transceiver 26 via, for example, coaxial cable or stripline 45, and third port 38 which is coupled by line 34 to radiator 32. Conductor 40 has central portion 46 and radiating arms 48, 50, 52 coupling central portion 46 to ports 42, 44, 38 respectively. Conductor 40 lies on dielectric layer or substrate 54 above ground plane 56 whereby conductor 40, substrate 54, ground plane 56, ferrite 36 and the applied DC magnetic field (Hdc) comprise a circulator. Transmitter section 27 and receiver section 28 are coupled to input-output (I/O) devices 29 whereby voice, data, or other information are entered into and received from transceiver 26.

In a preferred embodiment, radiator 32 has the form of a patch antenna of, for example, copper or highly conductive metal which is conveniently attached to a ferrite disk 36. While radiator 32 is illustrated in FIGS. 2–4 as having a circular shape, those of skill in the art will understand based on the description given here and that radiator 32 can be elliptical or polygonal or have any other shape appropriate to the frequency and power and bandwidth for the particular communication application which is desired to be satisfied. The design of a ferrite patch antenna is described, for example, by H. How et al. "Radiation Frequencies of Ferrite Patch Antennas", *Electronics Letters*, Vol. 28, No. 15, pp. 1405–1406, July 1992.

Conductor 40 is conveniently formed on dielectric substrate 54 using conventional printed wiring board technology well known in the art and placed in contact with ferrite disk 36. Alternatively, conductor 40 can be formed directly on ferrite disk 36 or can have the form of a thin metal foil which is pressed between ferrite disk 36 and dielectric substrate 54. Ground plane 56 underlying dielectric substrate 54 is conventional. Conductor 40 and ground plane 56 are typically made from copper or other high conductivity metals using means well known in the art.

Figure 6:
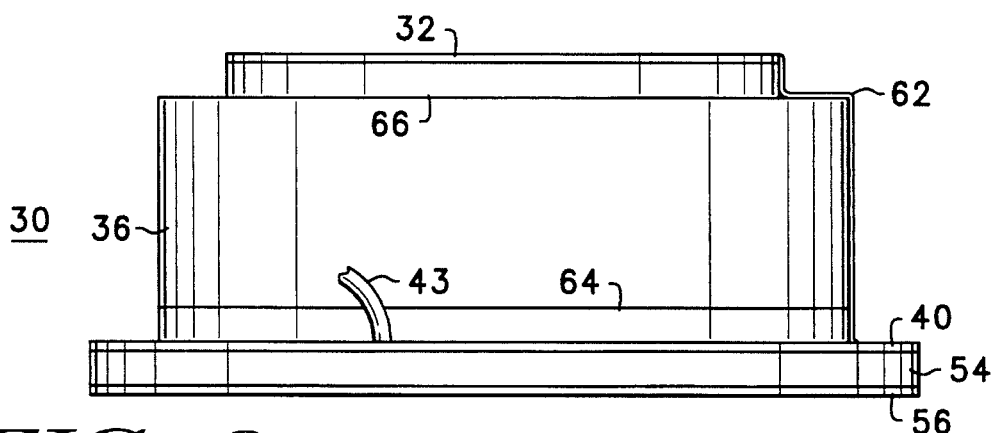
FIG. 6 is a view analogous to FIG. 2 but according to a still further embodiment of the present invention.

Conductor 40 functions so that RF energy injected into port 42 via line 43 appears at port 38 and is coupled via line 34 to radiator 32 for radiation into the atmosphere. Energy received by radiator 32 is coupled via line 34 to port 38 from whence it is delivered by conductor 40 to port 44 which is coupled via line 45 to receiver section 28 of transceiver 26. Thus, conductor 40 provides automatically and without requiring any active elements, the same functions provided by antenna switch 14 in prior art arrangement of FIG. 1. Conductor 40 in combination with ferrite disk 36, line 34 and radiator 32 also provides the functions of filters 16, 22. The design of circulators and circulators embodying filter functions to operate at a given frequency and bandwidth is described, for example, by H. How et al. "Novel Filter Design Incorporating Asymmetrical Stripline Y-Junction Circulators", *IEEE Transactions on Microwave Theory and Techniques*, Vol. 39, No. 1, pp. 40–46, January 1991; Y. S. Wu et al., "Wide-Band Operation of Microstrips Circulators", *IEEE Transactions on Microwave Theory and Techniques*, Vol. MTT-2, No. 10, pp. 849–856, October 1974; H. Bosma, "On Stripline Y-Circulation at UHF", *IEEE Transactions on Microwave Theory and Techniques*, pp. 612, January 1964; and C. E. Fay et al., "Operation of the Ferrite Junction Circulator",. *IEEE Transactions on Microwave Theory and Technique*, pp. 15–27, January 1965, and by others well known in the art FIGS. 5–6 are analogous to FIG. 2 but illustrating further embodiments of the present invention. In FIG. 5 line 34 interior to ferrite disk 36 is omitted and line 60 extending from port 38' of conductor 40 to radiator 32 is provided external to ferrite disk 36. In the embodiment of FIGS. 5–6, port 38' extends beyond the perimeter of ferrite body 36, as indicated by dashed outline 64 in FIG. 3.

In FIG. 6, interior line 34 between radiator 32 and conductor 40 is also omitted and replaced by exterior line 62 which is substantially conformal with ferrite disk 36, extending between radiator 32 and port 38' of conductor 40. FIG. 6 also illustrates a further embodiment of the present invention wherein dielectric layer 64 is provided between conductor 40 and ferrite disk 36 and dielectric layer 66 is provided between radiator 32 and ferrite disk 36. Both dielectric layer 64 and 66 need not be present at the same time. Either one can be used alone or both can be used in combination. The use of supplementary dielectric layers 64, 66 permits one to adjust the impedance and frequency response of integrated radiating and coupling device 30.

EXAMPLE

An example of a suitable arrangement for use at about 6 GHz is described using a circular ferrite disk and circular patch antenna, such as are illustrated for example, in FIGS. 2–4. Ferrite disk 36 is conveniently of yttrium iron garnet (YIG) with a saturation magnetization of about 1750 Oe and line width ($\Delta H$) of about 150 Oe and a relative dielectric constant of about 14.2. At 6 GHz the free space wavelength is about 5 cm. The ferrite disk 36 is operating above ferro-magnetic resonance. Disk 36 desirably has an outer diameter 37 of about 5.5–6.0 mm and a thickness 41 of about 1.0 mm. Radiator 32 has a diameter 33 of about 4.5 mm and is conveniently formed from copper or aluminum. Conductor 40 is conveniently formed of copper or aluminum with central region 46 of diameter 4.8 mm and radial arms 48, 50, 52 each having a width (perpendicular to their radial lengths) of about 1 mm and radial lengths sufficient to allow contacts to be made in the manner illustrated in FIGS. 2–4. Radial arms 48, 50, 52 are oriented about 120 degrees apart.

Dielectric board or substrate 54 separating conductor 40 from ground plane 56 is conveniently of an insulating material having a relative dielectric constant of about 10. A suitable example is "DUROID" sold by Rogers Microwave, Chandler, Ariz.

The frequency of operation can be adjusted by changing the size of the structural elements and the material characteristics. Conversely, if operation at the same center frequency is desired, but the antenna size increased, this can be accomplished by inserting a dielectric layer 66 between radiator 32 and ferrite disk 36 or lowering the dielectric constant of ferrite disk 36. The lower the dielectric constant of layer 66 and/or ferrite disk 36, the larger that radiator 32 should be to operate at a similar center frequency.

The foregoing dimensions and materials are approximate and are intended to be merely representative of a exemplary design. Persons of skill in the art will understand based on the explanation herein in combination with information known in the art, how to design an integrated radiator and circulator to suit the center frequency and bandwidth requirements of the communication system they are concerned with.

Figure 7:
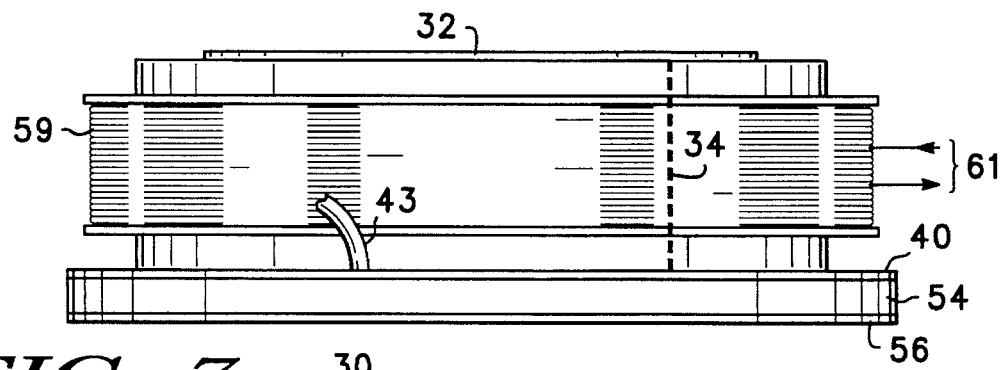
FIG. 7 shows a device according to the present invention analogous to that depicted in FIG. 2 with a further addition of a magnetic coil.

FIG. 7 is a side view analogous to that of FIG. 2 showing substantially the same device as depicted in FIG. 2 but with ferrite disk 36 surrounded by magnetic coil 59. Magnetic coil 59 is driven by electrical leads 61 which can supply either AC or DC or a combination thereof. Passing current through magnetic coil 59 changes the magnetic field within ferrite material 36 thereby changing its electromagnetic properties so as to modify the electrical characteristics of antenna 32, conductor 40, and coupling line 34. In particular, the magnetic field created by coil 59 can be used to adjust the frequency of operation and/or bandwidth of device 30. The effect of this magnetic field depends upon the particular ferrite chosen according to relationship known in the art.

Figure 8:
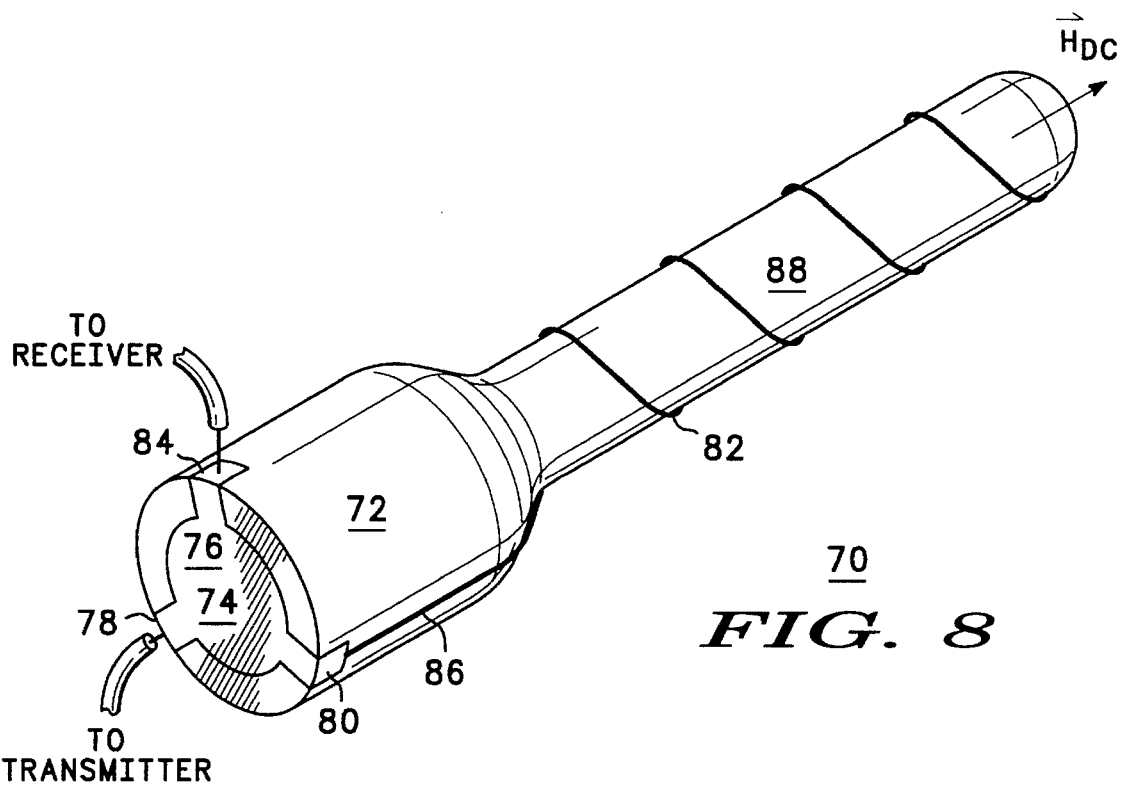
FIG. 8 is a perspective view of an integrated radiating and coupling device for duplex communications according to a still further embodiment of the present invention.

FIG. 8 is a perspective view of integrated radiating and coupling device 70 according to a further embodiment of the present invention. Device 70 comprises ferrite body 72 on which is provided conductor 74 having central region 76 and first port 78 coupled to a transmitter, second port 80 coupled to antenna 82 via line 86, and third port 84 coupled to the receiver portion of the communication device. Radiator 82 of FIG. 8 has, for example, a spiral shape and is wound around central core 88 which can be a dielectric or a ferrite material or a combination of the two having properties which are the same or different than the properties of ferrite region 72 adjacent conductor 74. The arrangement of FIG. 8 provides the same functions as provided by the device depicted in FIGS. 2–7, but by virtue of the difference of antenna design, provides a different radiation pattern.

While FIGS. 2–7 illustrate a patch-type antenna and FIG. 8 illustrates a spiral-type antenna, those of skill in the art will understand based on the teachings herein, that any type of antenna which is compatible with the physical and dimensional requirements of the communication system being constructed can be used in conjunction with a 3-port circulator of the type described herein to provide an integrated radiating and coupling device for a duplex communication transceiver. Persons of skill in the art will further understand based on the teachings herein that many other variations and combinations can be made without departing from the spirit of the present invention. Accordingly, it is intended to include such variations and combinations in the claims that follow.

I claim:

1. A duplex communication device, comprising:
   a circulator having a magnetic field applied thereto and including:
   a ferrite body having a first end and having a second end;
   a multi-port conductor formed on the ferrite body proximate the first end and having at least, a transmitter port, a receiver port, and a further port for coupling to a radiator;
   an electromagnetic radiator coupled to the ferrite body proximate the second end; and
   an electrical interconnection coupling the electromagnetic radiator to the further port of the multi-port conductor, wherein the electrical interconnection lies at least in part within the ferrite body.

2. The device of claim 1, further comprising a dielectric layer interposed between the electromagnetic radiator and the ferrite body.

3. The device of claim 1, further comprising a dielectric layer interposed between the multi-port conductor and the ferrite body.

4. The device of claim 1, wherein the electromagnetic radiator is spaced above the multi-port conductor by a first distance and wherein the electromagnetic radiator has a width greater than the first distance.

5. The device of claim 1, wherein the electromagnetic radiator is spaced above the multi-port conductor by a first distance and wherein the electromagnetic radiator has a width less than the first distance.

6. The device of claim 1, further comprising a coil for creating the magnetic field within at least a portion of the ferrite body.

7. The device of claim 1, further comprising a magnetic field generating coil extending around at least a portion of the ferrite body.

8. The device of claim 1, wherein the ferrite body has a side coupling the first end to the second end, and wherein the side has opposed portions spaced apart by a first distance and the first end and second end are separated by a second distance and wherein the second distance is less than the first distance.

9. The device of claim 8, wherein the electromagnetic radiator is a patch antenna.

10. The device of claim 1, wherein the ferrite body has a side coupling the first end to the second end, and wherein the side has opposed portions spaced apart by a first distance and the first end and second end are separated by a second distance and wherein the second distance is greater than the first distance.

11. The device of claim 10, wherein the electromagnetic radiator is a helical antenna.

12. The device of claim 1 further comprising a receiver section coupled to the receiver port, a transmitter section coupled to the transmitter port and an input-output device coupled to the receiver section and the transmitter section.

13. A duplex communication device, comprising:
    a circulator having a magnetic field applied thereto and including:
    a multi-port conductor mounted on a dielectric substrate over a ground plane, the multi-port conductor having an antenna port, a transmitter port, and a receiver port; and
    a ferrite body in contact with the multi-port conductor; and
    a patch antenna supported by the ferrite body and electrically coupled to the antenna port of the multi-port conductor.

14. The device of claim 13, wherein the multi-port conductor is coupled to a first face of the ferrite body and the patch antenna is coupled to an opposed second face of the ferrite body.

15. The device of claim 13, wherein the patch antenna and the antenna port of the multi-port conductor are electrically coupled by a wire extending at least partly through the ferrite body.

16. The device of claim 13, wherein the patch antenna has a planar shape that is polygonal.

17. The device of claim 13, wherein the patch antenna has a planar shape that is elliptical.

18. The device of claim 13, wherein the patch antenna has a planar shape that is round.

19. The device of claim 13, further comprising a dielectric layer interposed between the patch antenna and the ferrite body.

20. The device of claim 13, further comprising a dielectric layer interposed between the multi-port conductor and the ferrite body.

21. The device of claim 13 further comprising a receiver section coupled to the receiver port, a transmitter section coupled to the transmitter port and an input-output device coupled to the receiver section and the transmitter section.

22. A duplex communication device, comprising:
    a circulator having a magnetic field applied thereto and including:
    a ferrite core having a first face and having a second face; and
    a multi-port conductor formed on the first face, the multi-port conductor comprising a transmitter port, a receiver port, and an antenna port;
    an antenna mounted on the second face of the ferrite core; and
    an electrical lead interconnecting the antenna and the antenna port.

23. The device of claim 22, wherein the electrical lead passes at least in part through the ferrite core.

24. A duplex communication device, comprising:
    a circulator having a magnetic field applied thereto and including:
    a ferrite body having a first face and having a second face; and
    a multi-port conductor formed on the ferrite body proximate the first face and having a transmitter port, a receiver port, and a further port for coupling to a radiator;
    an electromagnetic radiator coupled to the ferrite body proximate the second face;
    an electrical interconnection coupling the electromagnetic radiator to the further port, wherein the electrical interconnection lies at least in part within the ferrite body;
    a transmitter section coupled to the transmitter port;
    a receiver section coupled to the receiver port; and
    an input-output device coupled to the transmitter section and the receiver section.

* * * * *